United States Patent
Talbotec et al.

(10) Patent No.: US 7,108,486 B2
(45) Date of Patent: Sep. 19, 2006

(54) BACKSWEPT TURBOJET BLADE

(75) Inventors: Jerome Talbotec, Combs la Ville (FR); Philippe Fessou, Melun (FR); Herbert Joly, Saclay (FR); Beatrice Bois, Evry-Gregy sur Yerres (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/776,274

(22) Filed: Feb. 12, 2004

(65) Prior Publication Data
US 2004/0170502 A1    Sep. 2, 2004

(30) Foreign Application Priority Data
Feb. 27, 2003   (FR) .................................. 03 02380

(51) Int. Cl.
F04D 29/38   (2006.01)
(52) U.S. Cl. .................... 416/243; 416/223 A
(58) Field of Classification Search ............... 416/238, 416/243, 223 R, 223 A
See application file for complete search history.

(56) References Cited

U.S. PATENT DOCUMENTS 3,989,406 A * 11/1976 Bliss .............................. 415/1
6,071,077 A * 6/2000 Rowlands ................ 416/223 A
6,358,003 B1 * 3/2002 Schlechtriem .............. 415/181
6,524,070 B1 * 2/2003 Carter ..................... 416/193 A

FOREIGN PATENT DOCUMENTS

| EP | 0 774 567 | 5/1997 |
| EP | 0 801 230 | 10/1997 |
| EP | 1 106 836 | 6/2001 |
| EP | 1 126 133 | 8/2001 |

* cited by examiner

Primary Examiner—Edward K. Look
Assistant Examiner—Devin Hanan
(74) Attorney, Agent, or Firm—Oblon, Spivak, McClelland, Maier & Neustadt, P.C.

(57) ABSTRACT

A rotary turbojet blade comprises a plurality of blade sections extending along a line of the centers of gravity of said sections between a base and a tip, said blade presenting along a radial axis a bottom portion, an intermediate portion, and a top portion, said bottom portion presenting a longitudinal angle of inclination for a leading edge line, said intermediate portion presenting a backward longitudinal angle of inclination for said leading edge line, and said top portion presenting a backward longitudinal angle of inclination for said leading edge line and a tangential angle of inclination for said line of the centers of gravity in a direction opposite to the direction of rotation of said blade.

7 Claims, 3 Drawing Sheets

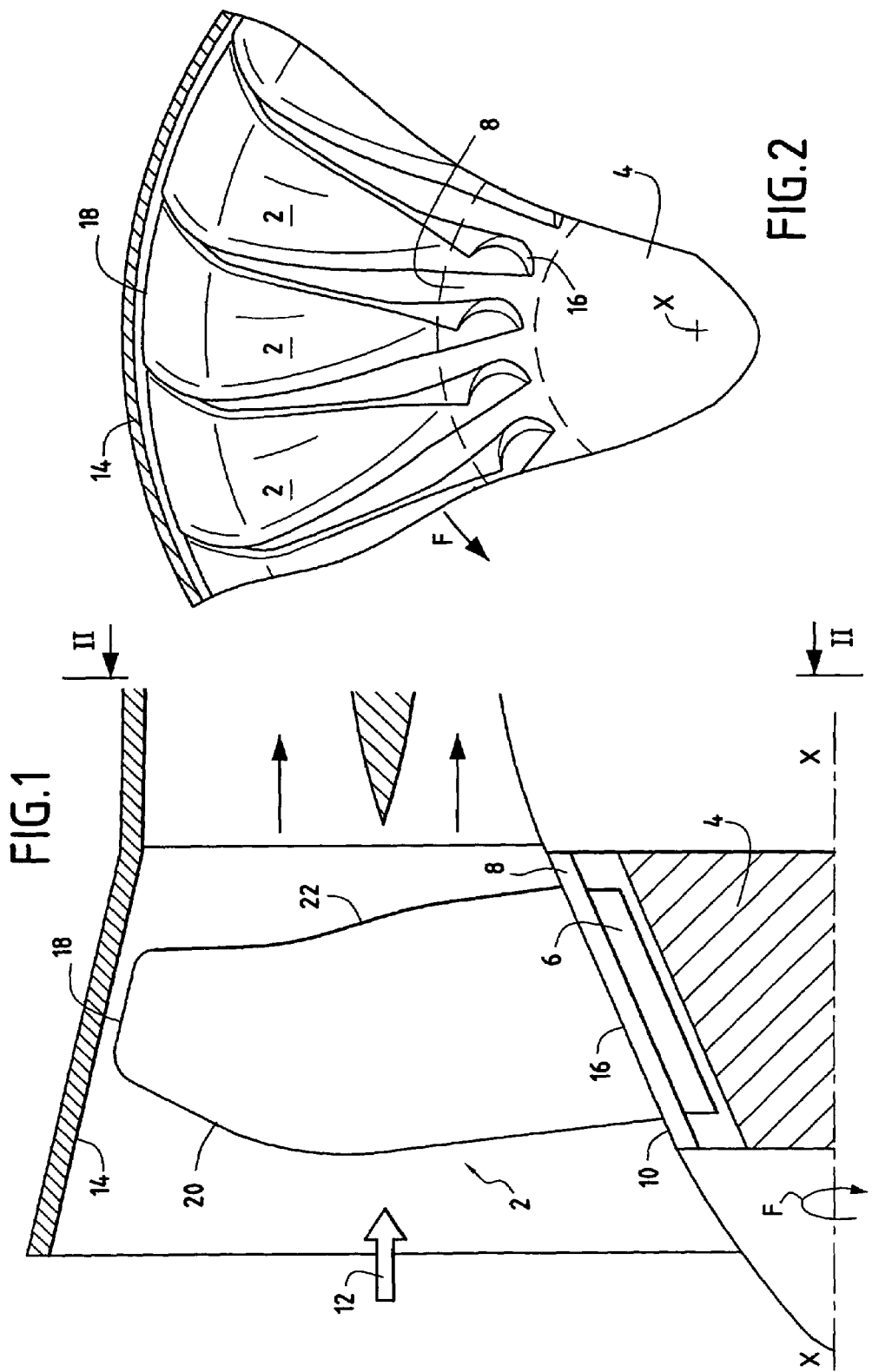

BACKSWEPT TURBOJET BLADE

BACKGROUND OF THE INVENTION

The present invention relates to the general field of backswept blades for turbojets. More particularly, the invention relates to the geometry of blades in the fan or the compressors of a turbojet.

A turbojet is provided in particular with a fan followed, in the flow direction of the gases passing through the turbojet, by a multistage compressor. The fan and the compressor are elements of the turbojet through which the gas flow passes. Each of them comprises a row of moving blades that are circumferentially spaced apart from one another so as to define passages for the gas flow. The blades of these elements are subjected to speeds of rotation that can generate subsonic to supersonic speeds in the flow of gas passing through these elements of the turbojet. Although high flow speeds make it possible in particular to improve the mass flow rate of the gas, thereby increasing the thrust of the turbojet, they can also sometimes present the drawback of generating high levels of noise. In particular, the "supersonic bang" corresponding to the gas flow switching from supersonic speeds to subsonic speeds contributes to a large fraction of such noise. Other interaction phenomena involving turbulence of the gas flow in the vicinity of the fan (broadband noise) also constitute sources of noise in the fan.

Engine manufacturers thus seek to devise fan and compressor blades that enable turbojet thrust to be increased while minimizing the noise generated by the flow of gas passing through the fan or the compressor. In addition, when designing such blades, various other parameters need to be taken into account such as the aerodynamics and the strength of such blades. Blades need to be designed so as to optimize the mass flow rate and the compression of the gas going past them, while guaranteeing good mechanical strength for the blades. In particular, at high speeds of rotation, the mechanical stresses to which the blades are subjected are more severe because of the high level of vibration and the centrifugal force that are applied to the blades.

Numerous geometries have been proposed for fan and compressor blades. They are characterized mainly by their stacking relationships for blade sections, their general curvature, and the possible presence of aerodynamically swept-back portions for improving aerodynamic performance and for reducing the noise generated by the fan and the compressors of the turbojet. However, none of those blades enable aerodynamic operation to be obtained that is efficient under all conditions of turbojet use, in particular both at high speed or high revolutions per minute (rpm) as occurs for example during takeoff and when the airplane reaches its maximum altitude, and at partial rpm, as happens for example during an airplane approach stage, and while also satisfying noise standards that are becoming more and more restrictive.

OBJECT AND BRIEF SUMMARY OF THE INVENTION

The invention thus seeks to mitigate such drawbacks by proposing a novel geometry for a fan or compressor blade of a turbojet, making it possible to guarantee optimum aerodynamic performance under all operating conditions of the turbojet while minimizing the noise generated. The invention also provides a turbojet fan and a turbojet compressor including a plurality of such blades.

To this end, the invention provides a rotary turbojet blade that is to be subjected to a longitudinal gas flow, said blade comprising a plurality of blade sections extending along a line of the centers of gravity of said blade sections between a base and a tip of said blade, said blade being defined longitudinally between a leading edge and a trailing edge, said blade presenting along a radial axis of said turbojet a bottom portion, an intermediate portion, and a top portion, said bottom portion extending radially from said blade base to a bottom limit of said intermediate portion, and said top portion extending radially from a top limit of said intermediate portion to said blade tip, wherein said bottom portion presents a longitudinal angle of inclination for a leading edge line, said intermediate portion presents a backward longitudinal angle of inclination for said leading edge line, and said top portion presents a backward longitudinal angle of inclination for said leading edge line and a tangential angle of inclination for said line of the centers of gravity of the blade sections in a direction opposite to the direction of rotation of said blade.

The combination of a high "belly" (where "belly" is defined as being the point on the leading edge having a longitudinal position of smallest value, i.e. the point situated at the bottom limit of the intermediate portion of the leading edge) together with a backswept portion offset in the axial direction and in the tangential direction (in the direction opposite to the direction of rotation of the blade) leads to a better radial distribution of the flow of gas going past the blade, thus enabling the mass flow rate capacity at high rpm to be increased and improving efficiency at partial rpm. As a result of these improvements in efficiency and of these reductions in angles of incidence, acoustic characteristics are improved. As a result, at low rpm, such a blade geometry benefits from the low level of noise of a straight blade in association with high efficiency, and at high rpm, it benefits from the high mass flow rate and the high efficiency performance of a backswept blade.

The position of the belly advantageously lies in the range 40% to 75% of the radial height of the blade between its base and its tip.

The longitudinal angle of inclination of the leading edge line of the bottom portion preferably lies in the range −5° to 15° relative to the radial axis of the turbojet. This limit on the junction angle between the base of the blade and the gas flow stream passing through serves to limit the mechanical stresses acting on the blade. In addition, the bottom portion of the blade may also have a tangential angle of inclination for the line of the centers of gravity of the blade sections. Advantageously, this tangential angle of inclination lies in the range −5° to 15° relative to the radial axis of the turbojet.

Similarly, the backward longitudinal angle of inclination of the leading edge line in the intermediate portion preferably lies in the range 5° to 20° relative to the radial axis of the turbojet. The intermediate portion of the blade may also have a tangential angle of inclination for the line of the centers of gravity of the blade sections. Advantageously, this tangential angle of inclination lies in the range −5° to 15° relative to the radial axis of the turbojet.

Preferably, the backward longitudinal angle of inclination of the leading edge line in the top portion lies in the range 20° to 50°, and the tangential angle of inclination of the line of the centers of gravity of the blade sections in the direction opposite to the direction of rotation of said top portion lies in the range 20° to 50° relative to the radial axis of the turbojet.

In a variant of the invention, the top portion of the leading edge further includes a top zone extending radially to the blade tip with a leading edge line presenting a forward longitudinal angle of inclination. This forward tilt of the top zone of the top portion of the blade enables the blade to be balanced mechanically but without harming its efficiency.

BRIEF DESCRIPTION OF THE DRAWINGS

Other characteristics and advantages of the present invention appear from the following description given with reference to the accompanying drawings which show an embodiment having no limiting character. In the figures:

FIG. 1 is a fragmentary longitudinal section view of a turbojet fan fitted with blades constituting an embodiment of the invention;

FIG. 2 is a section view on II—II of FIG. 1;

DETAILED DESCRIPTION OF AN EMBODIMENT

Figure 3B:
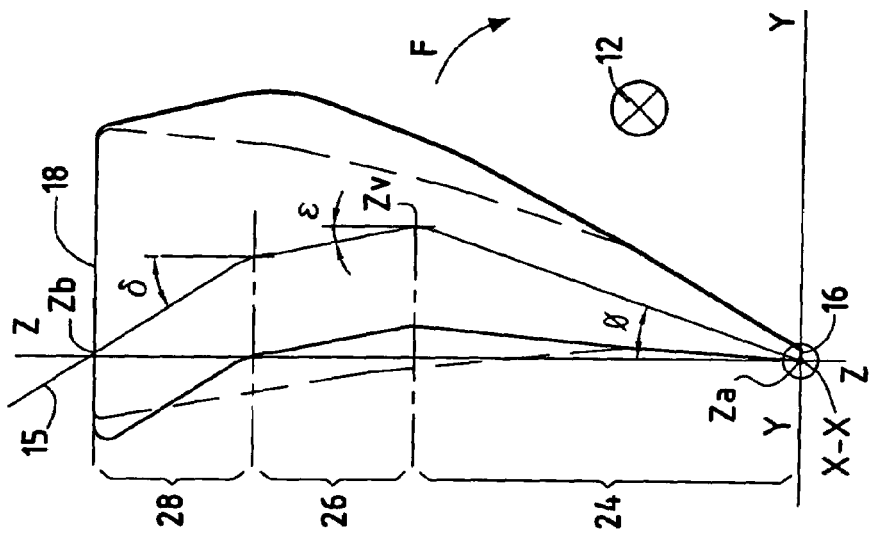
FIGS. 3A and 3B are respectively a longitudinal section view and a cross-section view of the FIG. 1 blade shown diagrammatically together with a diagrammatic representation of the profile of a prior art blade drawn in dashed lines.

FIGS. 1 and 2 are fragmentary and diagrammatic longitudinal and cross-sectional views of a turbojet fan fitted with blades constituting an embodiment of the invention. In the figures, the fan comprises a row of blades 2 that are regularly spaced apart from one another around a disk or hub 4. Each blade 2 is fixed to the disk or hub 4 by means of a root 6, which disk or hub 4 rotates about a longitudinal axis X—X of the turbojet in the direction of rotation indicated by arrow F. Each blade 2 also has a platform 8 which extends part of the way around the longitudinal axis X—X. When the blades are assembled on the disk or hub 4, the platforms 8 of adjacent blades come into mutual contact so as to define an inside wall 10 for an airflow stream 12 passing through the fan. A wall 14 of a casing surrounding the fan forms the outside wall of the airflow stream.

For the description below, the radial axis Z—Z of the turbojet is defined as being the axis perpendicular to the longitudinal axis X—X and passing through the center of gravity of the intersection between the blade and the inside wall of the airflow stream. A tangential axis Y—Y co-operates with the longitudinal axis X—X and the radial axis Z—Z of the turbojet to form a right-handed orthogonal frame of reference.

The blade 2 shown in the figures comprises a plurality of blade sections (not shown) that result from subdividing the blade in constant-altitude planes perpendicular to the radial axis Z—Z. These sections extend from the platform 8 along a line 15 through the centers of gravity of the blade sections. The line 15 of the centers of gravity of the blade sections is obtained by projecting the center of gravity of each blade section onto the plane defined by the tangential axis Y—Y and the radial axis Z—Z. As shown in FIG. 3B this line of the centers of gravity of the blade sections is a function of the height along the radial axis Z—Z of the centers of gravity of the blade sections. The line through the centers of gravity of the blade sections thus extends from a point of minimum height Za to a point of maximum height Zb. The point Za lies on the intersection between the blade and the inside wall of the airflow stream, and its altitude corresponds to a mean of the altitudes of the leading edge points and the trailing edge points of the blade on said intersection. The point Zb corresponds to the altitude of the last blade section that lies fully within the airflow stream.

Figure 3A:
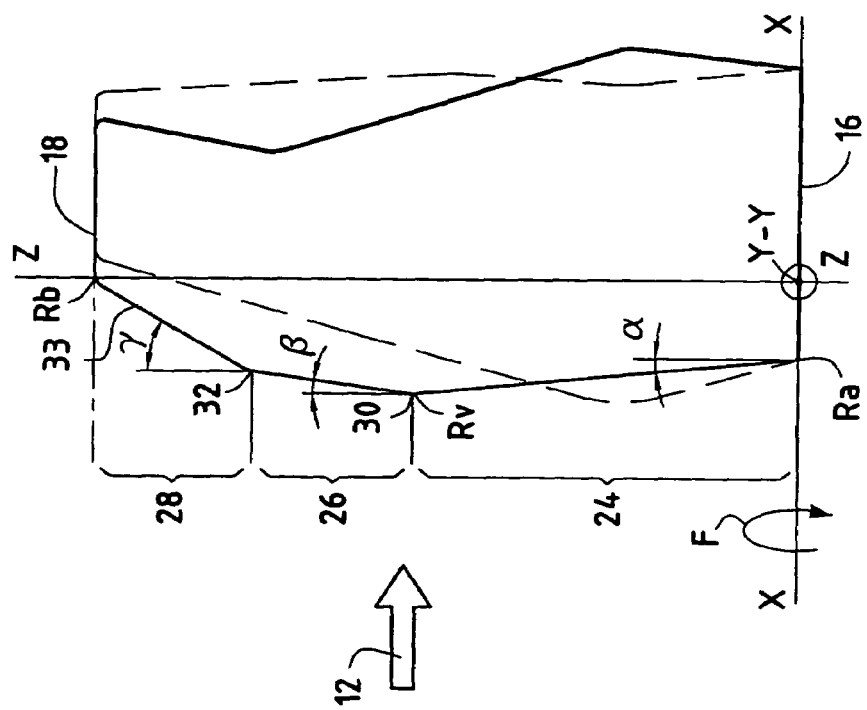

The blade is also defined radially between a base 16 and a tip 18 of the blade, and longitudinally between a leading edge 20 and a trailing edge 22. The blade 2 is also twisted starting from its base 16 and going to its tip 18 so as to co-operate with the airflow 12 passing through the fan when in operation. With reference more specifically to FIGS. 3A and 3B, it can be seen that the blade can be subdivided diagrammatically into a bottom portion 24, an intermediate portion 26, and a top portion 28. The bottom portion 24 extends along a radial axis Z—Z of the turbojet from the blade face 16 to a bottom limit 30 of the intermediate portion 26, and the top portion 28 extends radially from the top limit 32 of the intermediate portion 26 to the blade tip 18.

In accordance with the invention, a line 33 running along the leading edge 20 of the blade presents a forward or backward longitudinal angle of inclination $\alpha$ in the bottom portion 24 of the blade and presents a backward longitudinal angle of inclination $\beta$ in the intermediate portion 26 of the blade. In addition, the top portion 28 of the blade presents a backward longitudinal angle of inclination $\gamma$ for its leading edge line 33 together with a tangential angle of incidence $\delta$ in the direction opposite to the direction of rotation of the blade for the line 15 of the centers of gravity of the blade sections.

The leading edge line 33 of the blade is defined as being the projection at constant radius of the points of the leading edge 20 of the blade onto a meridian plane defined by the longitudinal axis X—X and the radial axis Z—Z, as shown in FIG. 3A. This leading edge line 33 is thus a function of the radii of the points on the leading edge. The radius of a point on the leading edge is defined between a minimum radius point Ra which corresponds to the leading edge 20 of the blade intersecting the inside wall of the airflow stream and a point of maximum radius Rb corresponding to the intersection between the leading edge and the outside wall of the flow stream.

The leading edge line 33 is said to have a longitudinal angle of inclination that is "forwards" to mean that the leading edge line 33 of the blade is inclined towards the front of the fan, i.e. towards the inlet of the airflow 12 passing through it. Similarly, a longitudinal angle of inclination is said to be "backwards" when the leading edge line is inclined towards the rear end of the fan, i.e. in the flow direction of the airflow 12 passing through it. In addition, an angle of inclination is said to be "tangential in the direction opposite to the direction of rotation of the blade" when the line 15 of the centers of gravity of the blade sections is inclined relative to the tangential axis Y—Y and when this tangential angle of inclination $\delta$ is in a direction opposite to the direction of rotation F of the fan. These angles of inclination $\alpha$, $\beta$, $\gamma$, and $\delta$ are all defined relative to the radial axis Z—Z of the turbojet.

With this configuration, the leading edge of the blade of the invention presents a minimum longitudinal abscissa point also referred to as a "belly" situated level with the bottom limit 30 of its intermediate portion 26. The abscissa along the longitudinal axis X—X of the turbojet is defined in the direction of the airflow 12. The leading edge of the blade of the invention also presents a backward sweep associated with blade sections being offset tangentially in the direction opposite to the direction of rotation of the fan. FIGS. 2 and 3B show this backward sweep in association with its tangential offset.

According to an advantageous characteristic of the invention, the minimum longitudinal abscissa point Rv or belly is situated in the range 40% to 75% of the total radial height of the blade. This radial height is measured from the base 16 towards the tip 18 of the blade. By definition, a minimum radial height of 0% corresponds to the point of intersection Ra between the leading edge and the inside wall of the airflow stream while a maximum radial height of 100% corresponds to the point of intersection Rb between the leading edge and the outside wall of the flow stream. In comparison, a prior art blade is shown in dashed lines in FIGS. 3A and 3B. In FIG. 3A, it can be seen in particular that the leading edge of the prior art blade also has a minimum longitudinal abscissa point. However, this minimum abscissa point is situated much lower down than the corresponding point of the blade of the present invention (at a radial height of about 30%).

In addition, it should be observed that the limit between the intermediate portion 26 and the top portion 28 of the blade is determined firstly for the leading edge line 33 by dividing the segment interconnecting the points Rv and Rb into two equal portions, and secondly for the line 15 of the centers of gravity of the blade sections by dividing the segments interconnecting the points Zv (of altitude identical to that of the point Rv) and Zb, likewise into two equal portions.

According to another advantageous characteristic of the invention, the longitudinal angle of inclination a of the leading edge line 33 of the bottom portion 24 of the blade lies in the range −5° to 15°. When this angle of inclination is negative, that means that it corresponds to a backward angle of inclination of the leading edge line, whereas it when is positive, it corresponds to a forward angle of inclination. This configuration makes it possible to limit the angle of the junction between the base 16 of the blade and the inside airflow steam. The mechanical stresses acting on the bottom portion of the blade are thus smaller than they are in a prior art blade where the junction angle is greater. In addition, the backward longitudinal angle of inclination β of the leading edge line 33 of the intermediate portion 26 of the blade preferably lies in the range 5° to 20°.

According to yet another advantageous characteristic of the invention, the top portion 28 of the blade presents a backward longitudinal angle of inclination γ (FIG. 3A) for the leading edge line that lies in the range 20° to 50°, and a tangential angle of inclination δ in the direction opposite to the direction of rotation of the blade (FIG. 3B) for the line 15 of the centers of gravity of the blade sections lying in the range 20° to 50° relative to the radial axis Z—Z of the turbojet.

According to yet another advantageous characteristic of the invention, the bottom portion 24 of the blade may also have a tangential angle of inclination φ for the line 15 of the centers of gravity of the blade sections. This tangential angle of inclination φ preferably lies in the range −5° to 15° relative to the radial axis Z—Z of the turbojet. When negative, this angle of inclination φ is in the direction opposite to the direction of rotation of the blade, and when positive, it is in the direction of rotation of the blade.

In addition, the intermediate portion 26 of the blade may also have a tangential angle of inclination ε for the line 15 of the centers of gravity of the blade sections. This tangential angle of inclination ε preferably lies in the range −5° to 15° relative to the radial axis Z—Z of the turbojet. When it is negative, this angle of inclination ε is in the direction of rotation of the blade, and when it is positive, it is in the direction opposite to the direction of rotation of the blade.

Figure 3C:
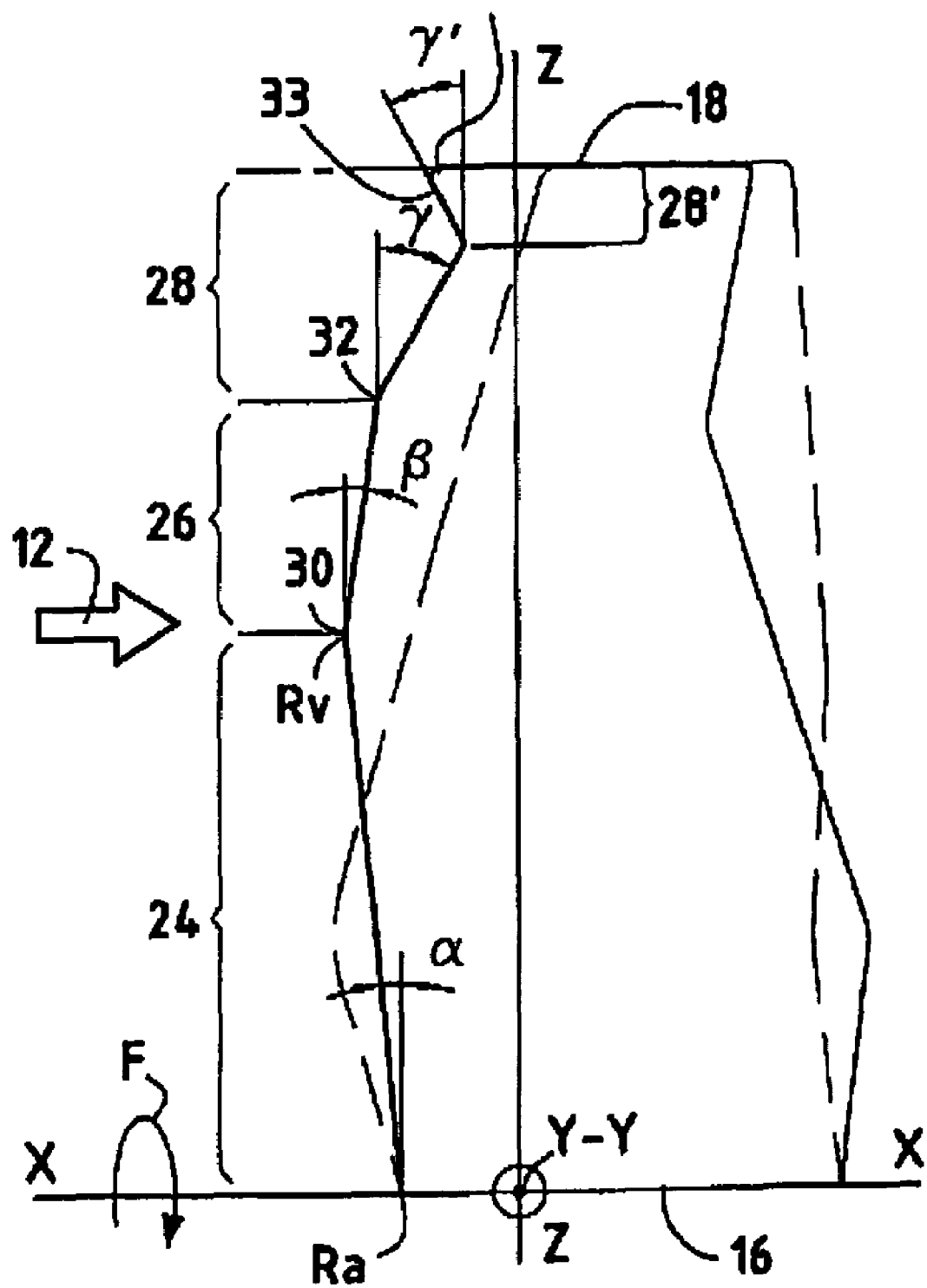
FIG. 3C is a longitudinal section view of a blade with a forward swept tip portion shown together with a diagrammatic representation of the profile of a prior art blade drawn in dashed lines.

All the angles of inclination α, β, γ, φ, and ε correspond to a blade that is strongly backswept in the longitudinal and tangential directions. Combining this backward sweep with the presence of a high belly serves in particular to reduce very greatly the angle of incidence of the blade profiles. In the top portion 28 of the blade, this great reduction in the angle of incidence leads in particular to a substantial gain of efficiency at partial rpm, thus improving the broadband noise generated by the airflow passing through the fan. In addition, the radial distribution of the flow of air passing through the fan as obtained by the blade of the present invention makes it possible to increase transfer of the airflow into the top portion of the blade.

Where necessary, in a variant of the invention, provision can also be made to cause the tip sections of the blade to tilt forwards (shown in FIG. 3C) so as to improve the mechanical behavior of the blade. The tip sections 28' of the blade are situated in an upper zone of the top portion 28 of the blade lying in the range 80% to 100% of its radial height. This forward tilt of the tip sections thus corresponds to a forward longitudinal angle of inclination γ of the leading edge line in this zone. For example, this angle of inclination γ may lie in the range 5° to 20°. This local tilt in the tip sections 28' has the advantage of balancing the blade while limiting differences between the centers of gravity of the blade sections, but without thereby affecting the aero-acoustic performance of the blade geometry.

A blade as described above forms part of the fan of the turbojet. Naturally, the present invention also applies to the blades of the high- and low-pressure compressors of the turbojet. In addition, it will be observed that the other geometrical characteristics of the blade (chord, thickness, profile of the trailing edge, blade camber, etc.) are not described since they do not constitute the subject matter of the present invention.

What is claimed is:

1. A rotary turbojet blade that is to be subjected to a longitudinal gas flow, said blade comprising a plurality of blade sections extending along a line of the centers of gravity of said blade sections between a base and a tip of said blade, said blade being defined longitudinally between a leading edge and a trailing edge, said blade presenting along a radial axis of said turbojet a bottom portion, an intermediate portion, and a top portion, said bottom portion extending radially from said blade base to a bottom limit of said intermediate portion, and said top portion extending radially from a top limit of said intermediate portion to said blade tip, wherein said bottom portion presents a longitudinal angle of inclination for a leading edge line, said intermediate portion presents a backward longitudinal angle of inclination for said leading edge line, said top portion presents a backward longitudinal angle of inclination for said leading edge line and a tangential angle of inclination for said line of the centers of gravity of the blade sections in a direction opposite to the direction of rotation of said blade, and said top portion further comprises a top zone extending radially to said blade tip in which the leading edge line presents a forward longitudinal angle of inclination.

2. A blade according to claim 1, wherein said bottom limit of the intermediate portion of the blade lies in the range 40% to 75% of the radial height of said blade between its base and its tip.

3. A blade according to claim 1, wherein the longitudinal angle of inclination of the leading edge line of said bottom portion lies in the range −5° to 15° relative to said radial axis of the turbojet.

4. A blade according to claim 1, wherein the backward longitudinal angle of inclination of the leading edge line of the intermediate portion lies in the range 5° to 20° relative to said radial axis of the turbojet.

5. A blade according to claim 1, wherein the backward longitudinal angle of inclination of the leading edge line of said top portion lies in the range 20° to 50°, and the tangential angle of inclination of the line of the centers of gravity of the blade sections of said top portion lies in the range 20° to 50° relative to said radial axis of the turbojet.

6. A blade according to claim 1, wherein said bottom portion further presents a tangential angle of inclination for the line of the centers of gravity of the blade sections lying in the range −5° to 15° relative to said radial axis of the turbojet.

7. A blade according to claim 1, wherein said intermediate portion further presents a tangential angle of inclination for the line of the centers of gravity of the blade sections lying in the range −5° to 15° relative to said radial axis of the turbojet.

* * * * *